A. W. SJOSTROM.
VEHICLE RUNNER.
APPLICATION FILED DEC. 9, 1916.
1,253,738. Patented Jan. 15, 1918.
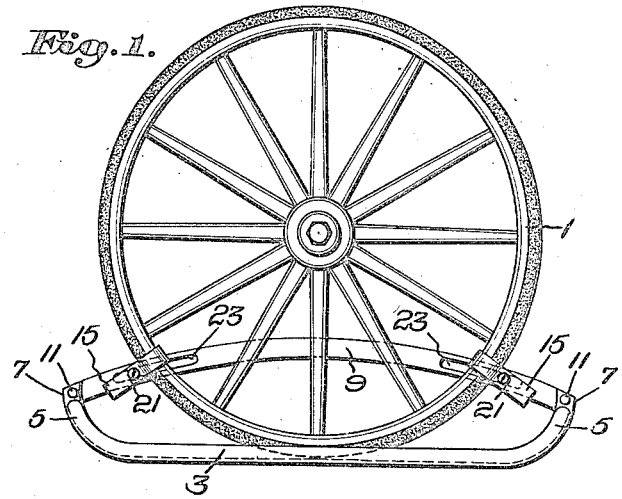
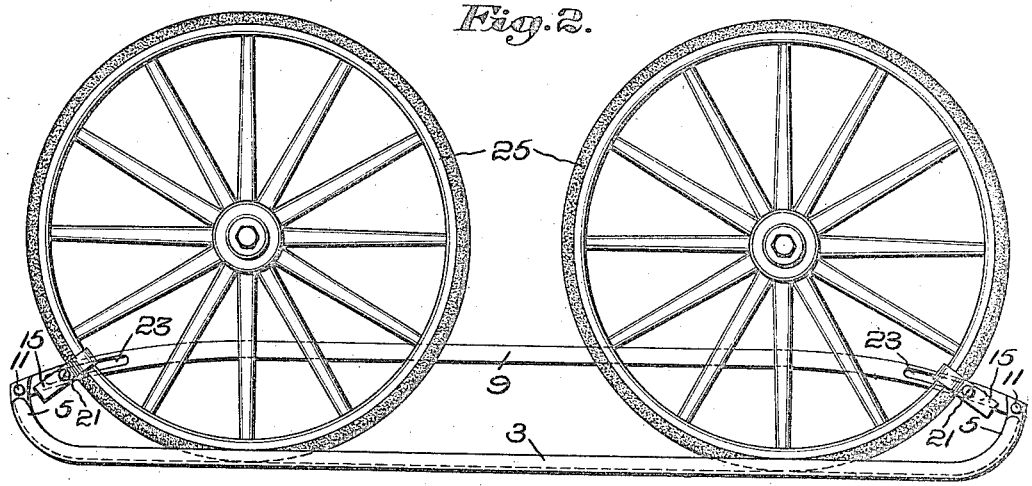
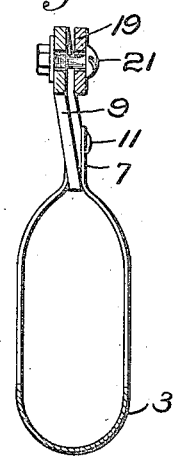
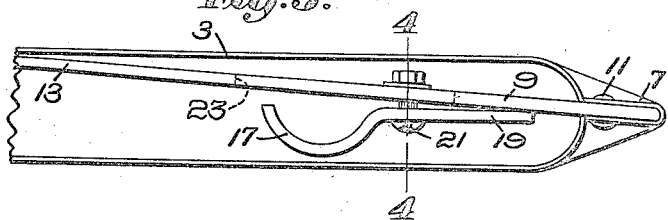
Inventor:
Adi W. Sjostrom
by Rob. T. Harris.
Attorney.

UNITED STATES PATENT OFFICE.

ADI W. SJOSTROM, OF WALTHAM, MASSACHUSETTS.

VEHICLE-RUNNER.

1,253,738.

Specification of Letters Patent. Patented Jan. 15, 1918.

Application filed December 9, 1916. Serial No. 136,083.

*To all whom it may concern:*

Be it known that I, ADI W. SJOSTROM, a citizen of the United States, residing at Waltham, county of Middlesex, and State of Massachusetts, have invented an Improvement in Vehicle-Runners, of which the following description, in connection with the accompanying drawings, is a specification, like characters on the drawings representing like parts.

This invention relates to runners for vehicle wheels.

One object of the invention is to provide a simple, cheap, strong runner which may be quickly and readily attached to or disconnected from a wheel. Another object is to form a runner of simply two members,—a shoe and a tie-bar, and simple clamps for securing the runner to the wheel. Still another object of the invention is to provide a runner common to and adapted to receive a pair of wheels.

The character of the invention may be best understood by reference to the following description of embodiments thereof shown in the accompanying drawing, wherein:—

Figure 1 is a side elevation of a wheel and a runner applied thereto, embodying the invention;

Fig. 2 is a side elevation of a pair of wheels and a runner common thereto embodying the invention;

Fig. 3, on an enlarged scale, is a plan of a portion of the runner; and

Fig. 4 is a vertical transverse section taken on the line 4—4 of Fig. 3.

Referring to the drawing: 1 designates a wheel equipped with a runner illustrating the invention. This runner comprises a metal elongated shoe 3, preferably U-shaped in transverse section, forming a groove for receiving the tire of the shoe. Obviously, the shape of the groove may vary to conform to rubber or metal tires as desired. The tire will rest upon the base of the groove and the walls of the groove will engage the sides of the tire and prevent lateral displacement of the tire without further operation after once seating the tire in said shoe.

Preferably, the ends of the shoe are similarly formed and in the present instance of the invention, they are curved upwardly as at 5 and have flattened terminals 7.

A tie-bar 9 extends in a general horizontal direction above the shoe and its ends are entered between said flattened terminals and secured thereto by rivets 11 or other appropriate means. Preferably, this bar is arched slightly to add to the strength thereof and render the same more or less yieldable.

The wheel when seated in the shoe, will stand in a vertical plane passing through the longitudinal axis of the shoe. Therefore, to accommodate the wheel, the tie bar may have a portion 13 intermediate the ends thereof offset from said plane, as will be noted in Fig. 3.

To secure the tie-bar to the wheel, it may be provided with suitable securing means. In the present instance of the invention, clamps 15 are provided for this purpose. They have curved ends 17 adapted to engage the rim of the wheel and shanks 19 adapted to be secured to the tie-bar by bolts 21 or equivalent means entered through elongated slots 23 in said bar. Thus these clamps may be readily adjusted longitudinally of the bar and may swing on said bolts to conform to wheels of different sizes and to facilitate the application of the clamps to and the release of the same from a wheel.

In Fig. 2 is shown a runner which is similar in construction and principle to the one already described, the only difference being that it is made longer to accommodate two wheels 25, instead of one wheel, and instead of being secured at two points to one wheel, is secured at a single point to each wheel.

The runner described is extremely simple in construction and cheap to manufacture. The shoe, tie-bar and clamps may be very readily stamped from sheet metal. It is merely necessary to secure the shoe and tie-bar together by a pair of rivets and then the runner is in readiness for use.

It will be understood that the invention is not limited to the particular embodiment shown, but that various deviations may be bade therein without departing from the spirit and scope of the claims.

What is claimed is:—

1. A runner for vehicle wheels, comprising a metal shoe, U-shaped in transverse section and having upwardly curved end portions with flattened terminals, an arched tie-bar having ends secured to said terminals and an intermediate portion offset from a vertical plane containing the longitudinal axis of said shoe, and clamp members on and adapted to coöperate with said bar to secure the runner to a wheel.

2. A runner for vehicle wheels comprising a metal shoe having upwardly curved ends and adapted to receive a wheel, a tie-bar extending between and secured to said ends having a portion offset laterally from said ends to accommodate the wheel, and means to secure said tie-bar to the wheel.

3. A runner for vehicle wheels comprising a shoe adapted to receive a wheel, a tie member secured to said shoe having a laterally offset portion to accommodate the wheel, and clamp means adapted to coöperate with said member to detachably secure the wheel between them.

4. A runner for vehicle wheels comprising an elongated shoe U-shaped in cross section adapted to receive a wheel and having upturned end portions, a tie-bar connected to the upturned end portions of said shoe and having a portion offset laterally between said end portions to accommodate the wheel, clamps on said bar, and bolts for drawing said clamps toward said bar to secure the wheel between them.

5. The combination with a pair of wheels, of a runner comprising an elongated shoe for receiving both of said wheels, a tie member extending along and secured to the ends of said shoe, and means adjustable longitudinally of the tie member to detachably secure said wheels to said tie member.

In testimony whereof, I have signed my name to this specification.

ADI W. SJOSTROM.

Copies of this patent may be obtained for five cents each, by addressing the "Commissioner of Patents, Washington, D. C."